(12) United States Patent
Mastaler et al.

(10) Patent No.: US 6,876,173 B2
(45) Date of Patent: Apr. 5, 2005

(54) BATTERY ADAPTER FOR A CORDLESS POWER TOOL SYSTEM AND RELATED METHOD

(75) Inventors: Thomas Mastaler, New Freedom, PA (US); Paul G. Gross, White Marsh, MD (US); Nathan May, Bethlehem, PA (US); Fred S. Watts, Shrewsbury, PA (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/776,859

(22) Filed: Feb. 11, 2004

(65) Prior Publication Data

US 2004/0160212 A1 Aug. 19, 2004

Related U.S. Application Data

(63) Continuation of application No. 10/095,289, filed on Mar. 8, 2002, now abandoned.

(51) Int. Cl.$^7$ ............................................. H01M 10/46
(52) U.S. Cl. ................................................. 320/114
(58) Field of Search ............................. 320/112, 113, 320/114, 115

(56) References Cited

U.S. PATENT DOCUMENTS

| | | | |
|---|---|---|---|
| 5,144,217 A | 9/1992 | Gardner et al. | 320/2 |
| 5,222,670 A | 6/1993 | Huang | 439/222 |
| 6,057,608 A | 5/2000 | Bailey, Jr. et al. | 307/43 |
| 6,170,579 B1 | 1/2001 | Wadge | 173/216 |
| 6,502,949 B1 | 1/2003 | Horiyama et al. | 362/119 |
| 6,525,511 B2 * | 2/2003 | Kubale et al. | 320/112 |

FOREIGN PATENT DOCUMENTS

| | | |
|---|---|---|
| EP | 1 128 517 A2 | 8/2001 |
| EP | 1 128 517 A3 | 12/2003 |

* cited by examiner

*Primary Examiner*—Edward H. Tso
(74) *Attorney, Agent, or Firm*—Harness, Dickey & Pierce P.L.C.

(57) ABSTRACT

An adapter for electrically connecting a battery pack with An electrical apparatus such as a cordless power tool or a charger. The adapter includes a first portion and a second portion. The first portion provides releasable attachment to the electrical apparatus. The second portion physically receives at least a portion of the battery pack. A method of converting an electrical apparatus for use with a battery pack not directly attachable to the electrical apparatus includes the steps of providing an adapter for electrically connecting the battery pack to an electrical apparatus, releasably attaching the adapter to the electrical apparatus and physically receiving at least a portion of the battery pack by the adapter so as to establish an electrical circuit between the electrical apparatus and the battery pack.

23 Claims, 6 Drawing Sheets

BATTERY ADAPTER FOR A CORDLESS POWER TOOL SYSTEM AND RELATED METHOD

CROSS-REFERENCE TO RELATED APPLICATION

This application is a continuation of U.S. patent application Ser. No. 10/095,289 filed on Mar. 8, 2002 now abandoned.

BACKGROUND AND SUMMARY OF THE INVENTION

The present invention generally pertains to power tools. More particular, the present invention pertains to a battery adapter for a cordless power tool system and a related method.

Cordless power tool systems including releasably attachable battery units are widely known in the pertinent art. Many known systems of tools utilize individual tool housings, each of which incorporates its own essential elements such as a motor and a reciprocal blade or rotatable chuck, for example. A common battery is selectively attachable to each of the tool housings. The common battery also engages with a battery charger.

A tool system with a common battery unit provides various advantages. For example, this type of system reduces space requirements for tool storage. Additionally, the life span for each motor is increased. Further, such systems incorporating a common battery unit improve the utilization of rechargeable battery packs and the associated battery charger which are particularly high cost elements of such systems.

Various interfaces are known for electrically and physically coupling a battery pack such as a rechargeable battery pack with an electrical apparatus such as a tool housing or battery charger. In one known manner of operatively connecting a rechargeable battery with an electrical apparatus, a nose portion of the rechargeable battery physically extends into the electrical apparatus for engagement of associated electrical terminals. Such an arrangement is occasionally referred to as a "plug-in" type interface.

One example of a plug-in type interface between a battery pack and a tool housing is shown and described in commonly assigned U.S. Pat. No. 5,144,217. U.S. Pat. No. 5,144,217, which is hereby incorporated by reference as if fully set forth herein, teaches a rechargeable battery pack having a housing with three main sections. A nose portion of the housing is insertable into a tool housing and carries a terminal block assembly. The terminal block assembly includes metal terminals which engage corresponding terminals carried by the tool housing for electrically connecting the battery pack with a motor. A middle portion of the battery pack housing is somewhat wider than the nose portion for partial accommodation of battery cells and also provides a horizontal ledge which supports the rechargeable battery pack in the tool housing or a charger assembly. A further enlarged upper portion of the housing accommodates a bulk of the rechargeable battery cells. U.S. Pat. No. 5,144,217 further discloses use of the same interface for electrically and physically coupling the rechargeable battery pack with a charger.

Another known type of battery pack/electrical apparatus interface incorporates rails on the battery pack which slidably engage corresponding grooves in the electrical apparatus. One example of a rail-type interface between a battery pack and a tool housing is shown in commonly assigned U.S. Pat. No. 6,057,608. U.S. Pat. No. 6,057,608 teaches a common rechargeable battery pack for a system of tools. The rechargeable battery pack includes a housing having an upper portion formed to include a pair of guide rails. The guide rails are slidably received within cooperating grooves defined in a housing of the tool. The upper portion of the housing of the battery pack carries a terminal block having a plurality of blade terminals. The blade terminals engage corresponding female terminals of a terminal block carried by the tool housing. U.S. Pat. No. 6,057,608 further discloses use of the same interface for electrically and physically coupling the rechargeable battery pack with a charger. U.S. Pat. No. 6,057,608 is hereby incorporated by reference as if fully set forth herein.

While prior art tool systems including releasably attached battery packs, including but not limited to the types disclosed in U.S. Pat. Nos. 5,144,217 and 6,057,608 have proven to be more than suitable for their intended purposes, each battery pack is limited for use with an associated set of dedicated tool housings and an associated charger. Thus, it remains desirable in the art to provide an adapter for a battery pack specifically designed for a first type of tool system which accommodates use of the battery pack with a second type of tool system.

It is a principal object of the present invention to provide an adapter for electrically connecting a battery pack with an electrical apparatus.

It is a related object of the present invention to provide a method of adapting an electrical apparatus for use with a battery pack which is not otherwise attachable to the electrical apparatus.

It is another object of the present invention to provide a method for converting a user of a first power tool system to a second power tool system.

In one form, the present invention provides an adapter for electrically connecting a battery pack with an electrical apparatus. The adapter includes a first portion and a second portion. The first portion provides releasable attachment to the electrical apparatus. The second portion physically receives at least a portion of the battery pack. In a related aspect, the present invention provides a cordless power tool assembly having a tool housing, a motor, a battery pack and an adapter. The motor is mounted in the housing for driving a working member. The battery pack provides power to the motor. The adapter electrically connects the battery pack and the motor. The adapter is releasably attached to the tool housing and physically receives at least a portion of the battery pack.

In a related aspect, the present invention provides a cordless power tool assembly having a tool housing, a motor, a battery pack and an adapter. The motor is mounted in the housing for driving a working member. The battery pack provides power to the motor. The adapter electrically connects the battery pack and the motor. The adapter is releasably attached to the tool housing and physically receives at least a portion of the battery pack.

In another form, the present invention provides a method for converting an electrical apparatus for use with a battery pack not directly attachable to the housing. The method includes the general step of providing an adapter for electrically connecting the battery pack to the electrical apparatus. The method additionally includes the step of releasably attaching the adapter to the electrical apparatus. Further, the method of the present invention includes the step of physically receiving at least a portion of the battery pack by the adapter so as establish an electrical circuit between the electrical apparatus and the battery pack.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
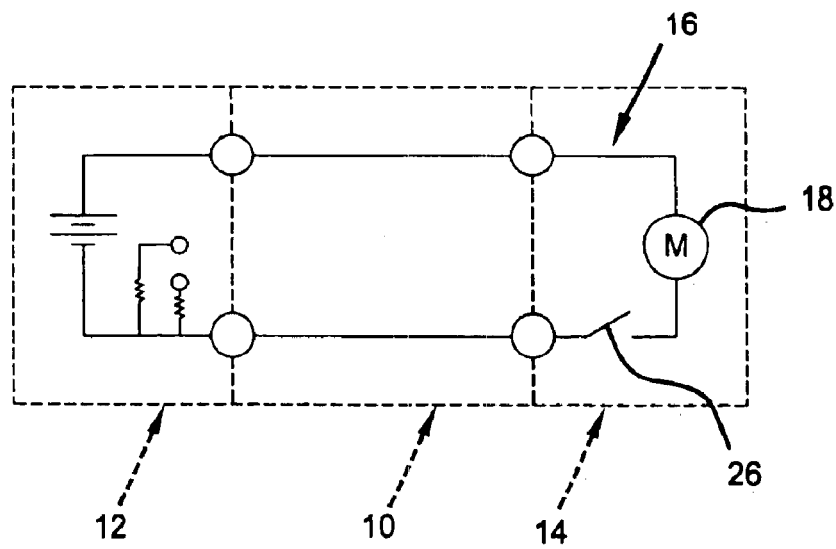
FIG. 1 is a schematic view of a circuit for electrically connecting a battery pack to a cordless power tool housing through an adapter constructed in accordance with the teachings of the present invention.

With initial reference to FIG. 1, an adapter 10 for physically and electrically interconnecting a battery pack with an electrical apparatus is schematically illustrated and generally identified at reference numeral 10. In the exemplary embodiment, the adapter 10 is shown operatively coupling a battery pack 12 and an electrical apparatus in the form of a tool housing 14. As will be described further below in connection with the various embodiments of the present invention, the tool housing 14 incorporates its own essential elements such as a motor and a working element. However, it will be understood by those skilled in the art that the teachings of the present invention are not so limited. In this regard, the various adapters of the present invention may be utilized in a tool system incorporating a plurality of interchangeable tool heads. Such a tool system is shown and described in commonly assigned U.S. Pat. No. 6,170,579, which is hereby incorporated by reference as if fully set forth below.

The adapter 10 is shown operatively associated with the battery pack 12 and the tool housing 14 to complete an electrical circuit 16 between the battery pack 12 and motor 18 carried by the tool housing 14. The battery pack 12 illustrated is a non-dedicated battery pack 12 but has a voltage compatible with the tool housing 14. As used herein, the term "non-dedicated" as used to describe the battery pack 12 shall mean any battery pack which was not particularly designed for use with a specific tool housing and therefore is not directly attachable to the electrical apparatus (e.g., the tool housing) either physically or electrically.

Figure 2A:
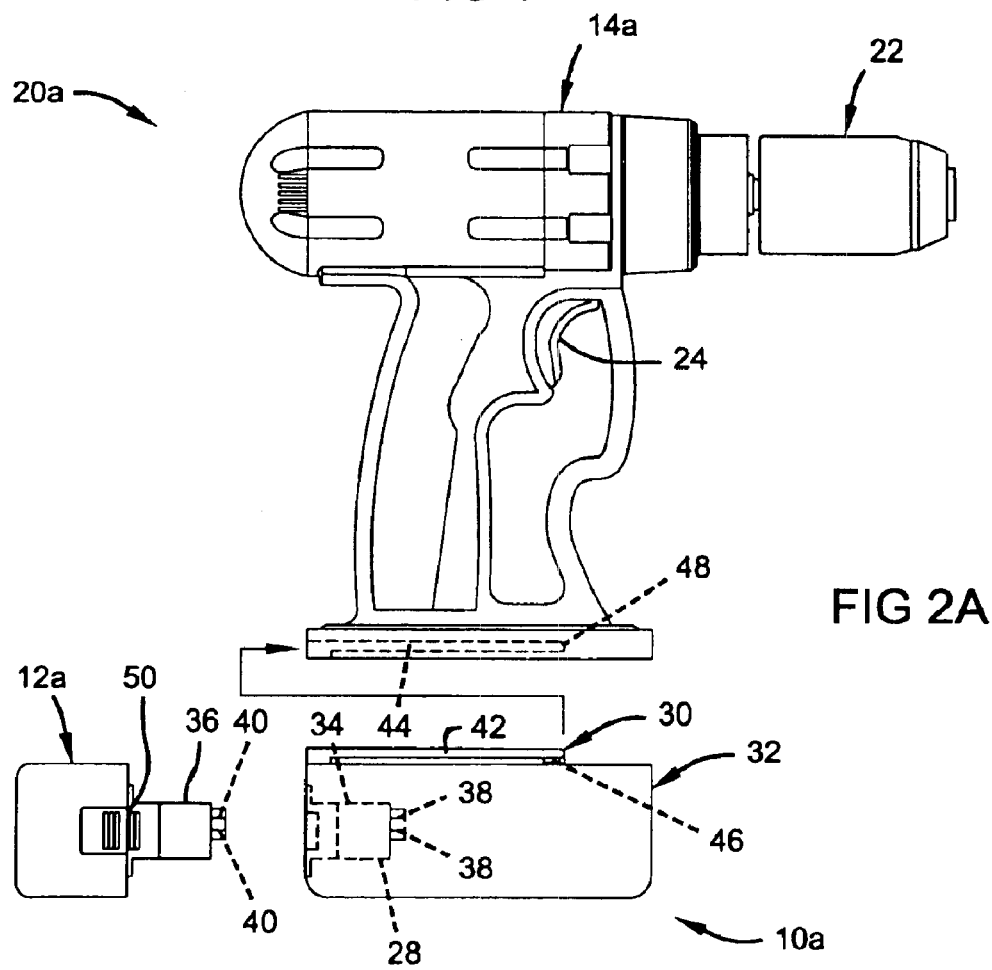
FIG. 2A is an exploded side view of a cordless power tool assembly including a first preferred embodiment of an adapter for electrically connecting a power pack and a power tool housing constructed in accordance with the teachings of the present invention.
Figure 2B:
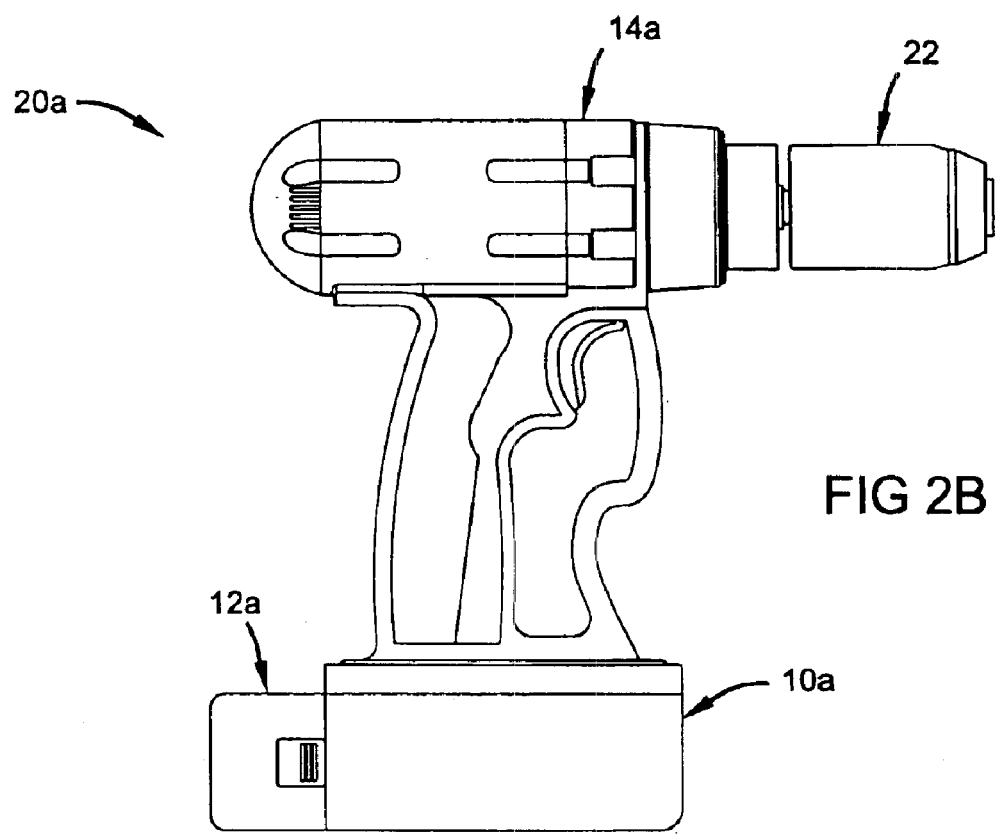
FIG. 2B is an assembled side view of the cordless power tool assembly of FIG. 2A.
Figure 2C:
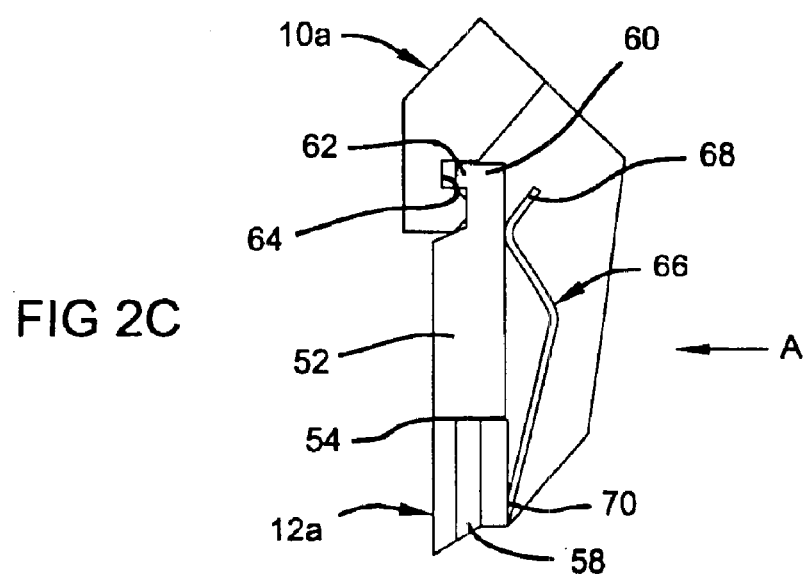
FIG. 2C is a simplified cross-sectional view illustrating a latching mechanism of the first preferred embodiment of the present invention.

With continued reference to the schematic diagram of FIG. 1 and additional reference to FIGS. 2A through 2C, a cordless power tool assembly 20 including an adapter 10A constructed in accordance with the teachings of a first preferred embodiment of the present invention is illustrated. The power tool assembly 20A is further shown to include a battery pack 12A from a first power tool system and a tool housing 14A from a second power tool system. The battery pack 12A is preferably a rechargeable battery pack. However, it will be understood that a disposable battery pack may be used within the scope of the present invention.

The exemplary tool housing 14A shown in connection with the adapter 10A is for a drill and includes a working member in the form of a rotatable chuck 22. The rotatable chuck 22 conventionally engages a drill bit (not shown). The rotatable chuck 22 is driven by the motor 18 (schematically shown in FIG. 1) upon manual depression of a trigger 24 which controls an electrical switch 26. It will be appreciated by those skilled in the art that the present invention is not limited to any particular type of tool.

The tool housing 14A is of the type which has been specifically designed for releasable engagement with a dedicated rail-type battery pack. As used herein, the term "dedicated" shall mean a battery pack specifically designed to directly and releasably engage a particular tool housing physically and electrically. This type of dedicated battery pack is illustrated, for example, in U.S. Pat. No. 6,057,608.

The adapter 10A functions to electrically interconnect the battery pack 12A with the motor 18 and physically interconnect the battery pack 12A with the housing 14A. The adapter 10A includes a first portion or battery interface 28 and a second portion or tool housing interface 30. Preferably the battery interface 28 is designed to mimic the interface between the battery pack 12A and the dedicated type of tool which normally receives the battery pack 12A. Similarly, it is preferable that the tool housing interface 30 mimic the interface between the tool housing 14A and its corresponding dedicated battery pack.

The adapter 10A is illustrated to include a housing 32 which defines an opening 34 for receiving a nose portion 36 of the battery pack 12A. A pair of terminals 38 are disposed in a forward portion of the aperture 34. Upon insertion of the nose portion 36 into the aperture 34, the terminals 38 engage a corresponding pair of terminals 40 carried by the nose portion 36 of the battery pack 12A.

An upper portion of the housing 32 defines a pair of longitudinally extending rails, one of which is identified at reference number 42. The rails 42 slidably engage corresponding grooves 44 defined in the tool housing 14A. The upper portion of the housing 32 carries a terminal block with a pair of terminals 46 which engage a corresponding pair of terminals 48 carried in tool housing 14A.

The battery pack 12A is illustrated to include a latching mechanism 50 for engaging the housing 32 of the adapter 10A. With all other respects, the exemplary battery pack 12A illustrated is substantially identical to that disclosed in U.S. Pat. No. 5,144,217. The particular latching mechanism 50 is shown in greater detail in the cross-sectional view of FIG. 2C. The latching mechanism 50 includes a button portion 52 which extends through an opening 54 defined in the housing of the battery pack 12A.

In one application, the latching mechanism 50 is unitarily constructed of plastic or other suitable material and is connected to the housing through a cantilevered portion 58. An upper portion 60 of the latching mechanism 50 includes an outwardly extending flange 62 which engages a groove 64 formed in the housing 32 of the adapter 12A. A spring member 66 biases the latching mechanism 50 outwardly in the direction of arrow A. An upper end 68 of the spring 66 engages the latching mechanism 50 and a lower end 70 is interconnected to a housing of the battery pack 12A in any conventional manner. In operation, the button 52 of the latching mechanism 50 is inwardly depressed against the bias of the spring 66 such that the rechargeable battery pack 12A can be securely attached to or removed from the adapter 10A.

Figure 3A:
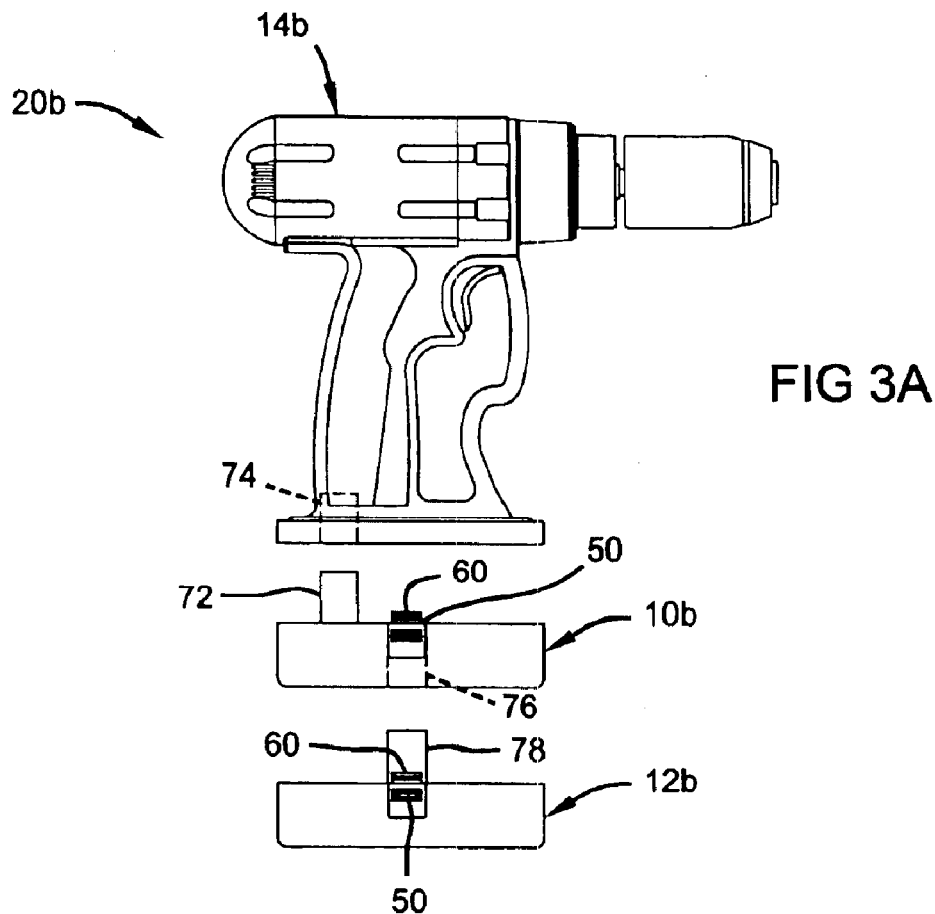
FIG. 3A is an exploded side view of a cordless power tool assembly including a second preferred embodiment of an adapter for electrically connecting a power pack and a power tool housing constructed in accordance with the teachings of the present invention.
Figure 3B:
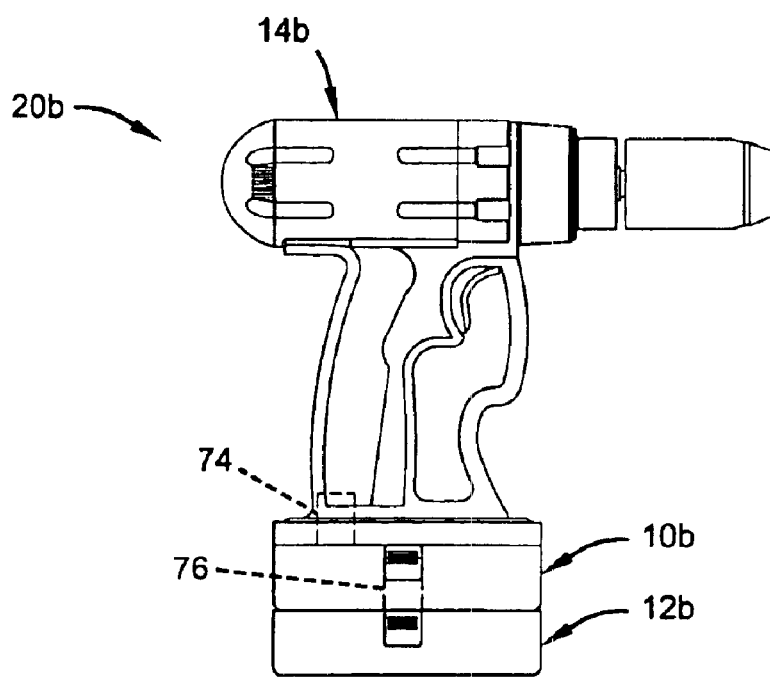
FIG. 3B is an assembled side view of the cordless power tool assembly of FIG. 3A.

Turning to FIGS. 3A and 3B, a cordless power tool assembly constructed in accordance with the teachings of a second preferred embodiment of the present invention is illustrated and generally identified at reference number 20B. As with the cordless power tool assembly 20A, the cordless power tool assembly 20B of the second preferred embodiment includes an adapter 10B for connecting a rechargeable battery pack 12B with a tool housing 14B. The adapter 10B is illustrated to include an upwardly extending nose portion 72 which is received within a matingly configured aperture 74 provided in the tool housing 14B. While not illustrated, it will be understood that the nose portion 72 carries a pair of terminals which engage corresponding terminals provided in the tool housing 14B. A lower part of the housing of the adapter 10B defines an aperture 76 sized to receive an upwardly extending nose portion 78 of the non-dedicated rechargeable battery pack 12B. Again, while not particularly illustrated, it will be understood that the nose portion 78 of the rechargeable battery pack 12B includes a pair of terminals which engage a corresponding pair of terminals disposed within the aperture 76 of the adapter 10B. The adapter 10B electrically functions to bridge the terminals of the rechargeable battery pack 12B and the terminals carried by the tool housing 14B.

The power tool assembly 20B is illustrated to include a pair of latch mechanisms 50 which are identical to that discussed above with respect to the first preferred embodiment. A first of the latch mechanisms 50 includes a button carried by the housing of the adapter 10B and a portion 60 for engaging the tool housing 14B. Similarly, a second of the latching mechanisms 50 is carried by the body of the rechargeable battery pack 12B and includes a portion 60 for releasably engaging the adapter 10B.

Figure 4A:
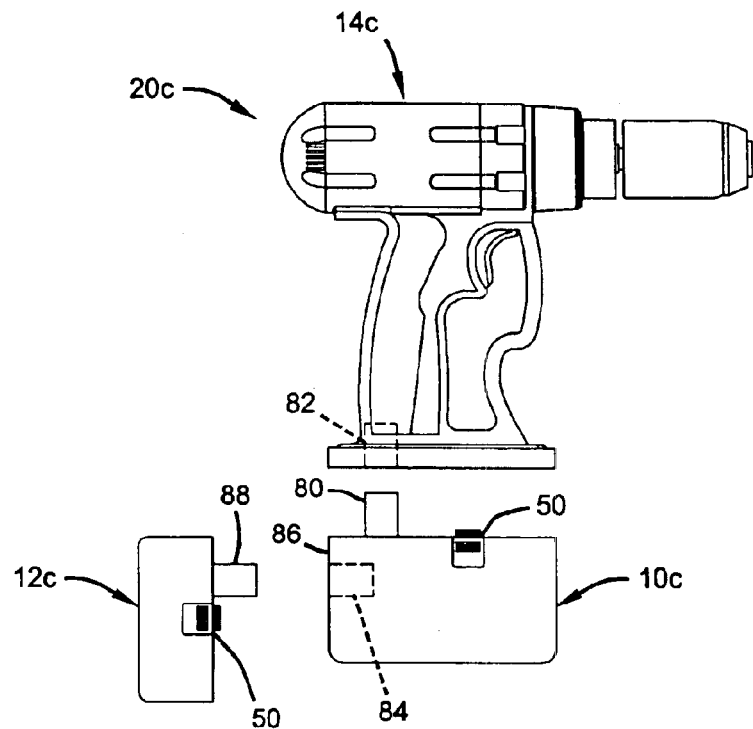
FIG. 4A is an exploded side view of a cordless power tool assembly including a third preferred embodiment of an adapter for electrically connecting a power pack and a power tool housing constructed in accordance with the teachings of the present invention.
Figure 4B:
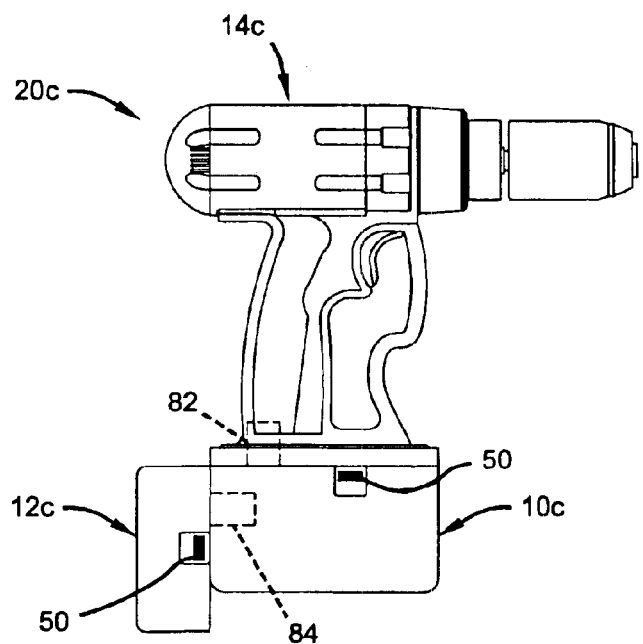
FIG. 4B is an assembled side view of the cordless power tool assembly of FIG. 4A.

Turning now to FIGS. 4A and 4B, a cordless power tool assembly constructed in accordance with a third preferred embodiment of the present invention is illustrated and generally identified at reference number 20C. Similar to the second preferred embodiment, the power tool assembly 20C of the third preferred embodiment includes an adapter 10C including an upwardly extending nose portion 80 which is received within an aperture 82 provided in a tool housing 14C. Different from the second preferred embodiment, the adapter 10C defines an aperture 84 which opens to a sidewall 86 of a housing of the adapter 10C. The aperture 84 receives a laterally extending nose portion 88 of a rechargeable battery pack 12C. The terminal connections between the battery pack 12C and the adapter 10C, as well as the adapter 10C and the tool housing 14C are identical to the corresponding connections of the first and second preferred embodiments of the present invention. Again, latching mechanisms 50 are incorporated to releasably secure the battery pack 12C to the adapter 10C and the adapter 10C to the tool housing 14C.

Figure 5A:
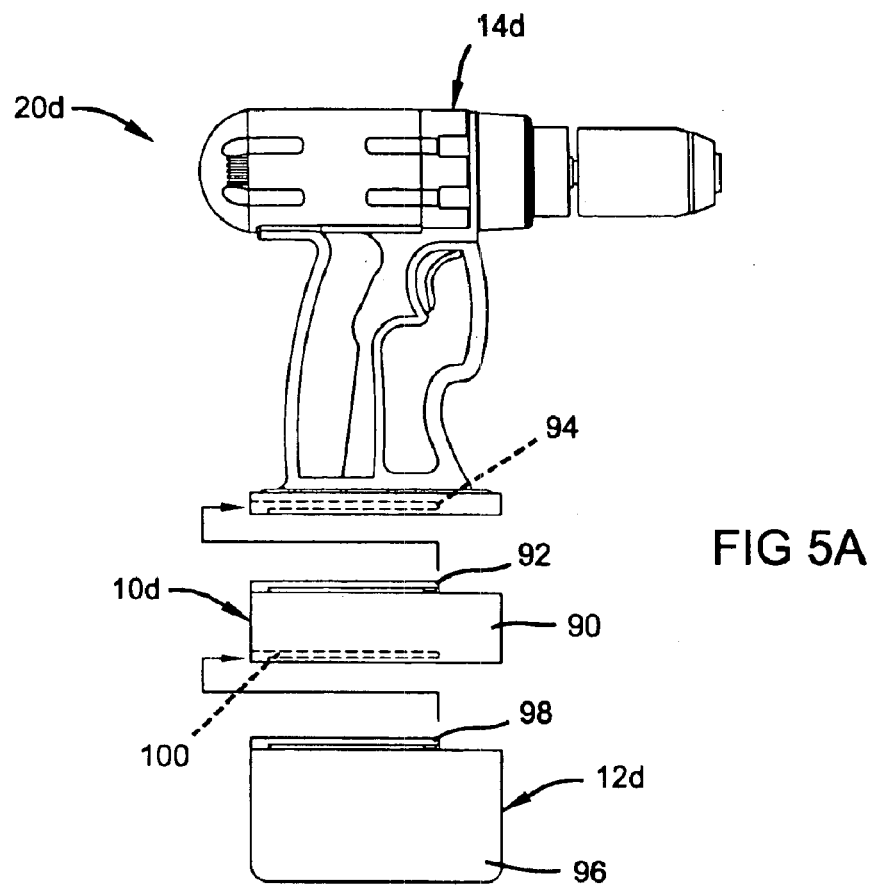
FIG. 5A is an exploded side view of a cordless power tool assembly including a fourth preferred embodiment of an adapter for electrically connecting a power pack and a power tool housing constructed in accordance with the teachings of the present invention.
Figure 5B:
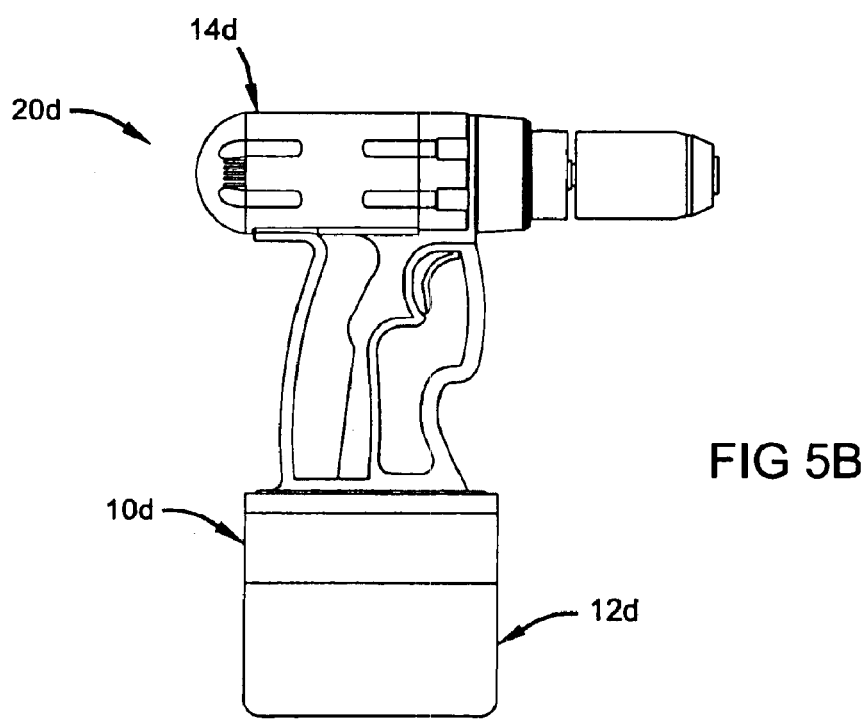
FIG. 5B is an assembled side view of the cordless power tool assembly of FIG. 5A.

Turning now to FIGS. 5A and 5B, a power tool assembly constructed in accordance with a fourth preferred embodiment of the present invention is illustrated and generally identified at reference number 20D. In this embodiment, the power tool assembly includes an adapter 10D having a housing 90 with an upper portion defining a pair of longitudinally extending rails, one of which is identified at reference number 92. The rails 92 slidably engage grooves 94 defined by a tool housing 14D in a manner substantially identical to that described in U.S. Pat. No. 6,057,608. It will be understood that the upper portion of the housing 90 of the adapter 10D carries a terminal block which engages a corresponding terminal block carried by the tool housing 14D.

The power tool assembly 20D of the fourth preferred embodiment of the present invention includes a rechargeable battery pack 12D which is substantially identical to that disclosed in U.S. Pat. No. 6,057,608. The rechargeable battery pack 12D includes a housing 96 having a portion defining a pair of longitudinally extending rails, one of which is identified at reference number 98. The rails 98 slidably engage a corresponding pair of grooves 100 defined in a lower portion of the adapter 10D.

While not particularly illustrated, it will be understood that suitable latching mechanisms may be incorporated to secure the adapter 10D to the tool housing 14D and the rechargeable battery pack 12D to the adapter 10D. One suitable latching mechanism is described in U.S. Pat. No. 6,057,608. It is also anticipated that the various embodiments may incorporate lock-out tabs on the battery interface, the tool housing interface, or both to lock out unwanted battery packs of different operating voltages. It is further anticipated that ballast may be added to the various adapters to maintain or improve the weight distribution of the power tool assemblies.

It will now be appreciated by those skilled in the art that the subject invention includes various adapters for both mechanically and electrically interconnecting a battery unit and a tool housing which are otherwise incompatible. The adapters of the present invention may have a single purpose intent of connecting a first type of battery for attachment to a specific type of tool housing, such as the adapters disclosed herein. Alternatively, the adapter may have a multi-purpose intent of adapting a first type of battery for selective attachment to one of various types of tool housings.

The adapters may include electronic modules for tool control, state of charge/discharge diagnostics, application data logging for collecting information about the battery pack, tool, and/or environment, forced air-cooling, current limiting, and other related functions. For example, the adapters may include a discharge feature having a manually operated button. When the button is pushed, a load is applied to the battery pack. If the voltage drop is greater than a predetermined value, the battery pack 12 is discharged and an indicator lights. The adapters may also incorporate a light emitting device for a flashlight function, a laser light for guiding a saw blade or drill bit, a docking station for accessories, drill bits, saw blades, wrenches and the like, a stud/pipe sensor, and/or a tool plumb/level. Still yet further, the adapters may incorporate a radio that is powered by the battery pack, a dust collection system, and/or a cycle counter to track charge/discharge cycles.

Figure 6:
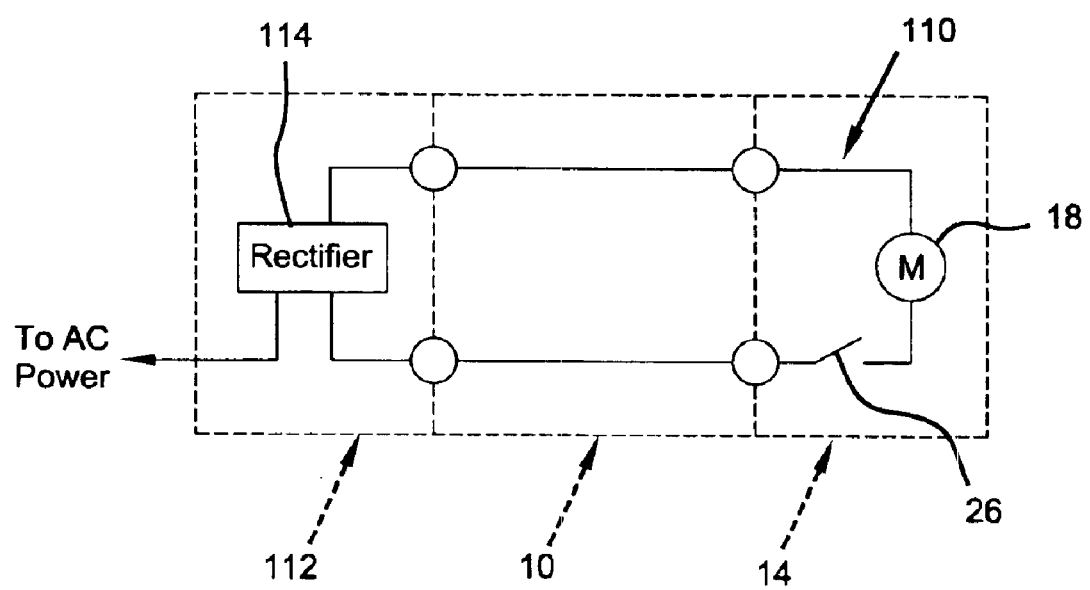
FIG. 6 is a schematic view of a circuit for electrically connecting a battery pack to a charger through an adapter in accordance with the teachings of the present invention.

The various adapters of the present invention are shown throughout the drawings mechanically and electrically coupling a battery pack (e.g., battery pack 12A) and an electrical apparatus in the form of a tool housing (e.g., tool housing 14A). However, it will be understood by those skilled that the teachings of the present invention are also applicable for coupling a battery pack and a charger. In this regard, FIG. 6 schematically illustrates an electrical circuit 110 electrically connecting a battery pack 12 to a charger 112 through one of the adapters 10 according to the teachings of the various embodiments of the present invention. The adapter 10 completes the electrical circuit 110 between the otherwise incompatible charger 112 and tool housing 14. The charger 112 will be understood to be conventional in construction and include a rectifier 114 for converting an AC current to DC current.

The subject invention also relates to a method of converting a tool user from a first system of cordless power tools (i.e., a power tool system having a first type of interface for connecting a battery and a tool housing) to a second system of cordless power tools (i.e., a power tool system having a second type of interface for connecting a battery and a tool housing). The first system of power tools includes a first power tool housing, such as that disclosed in U.S. Pat. No. 5,144,217, and a first battery, such as battery 12A, dedicated for use with the first power tool system. The second system of power tools includes a second power tool housing, such as tool housing 14A, and a second battery, such as 12D, dedicated for use with the second power tool system.

The method of the subject invention includes the step of providing an adapter, for example 10A, for electrically and physically coupling the first battery and the second tool housing. Additional exemplary adapters are described above. Through the provision of an adapter able to couple the first battery and the second tool housing, the tool user will have various options when the first battery reaches the end of its functional life. In this regard, the tool user can purchase a replacement for the first battery and continue to use the adapter, or the tool user can purchase a replacement for the second battery. If the user chooses the latter, when tool housings or chargers of the first tool system reach the end of their functional lives, the user can purchase tool housings and chargers of the second system of tools.

The subject invention provides a method of converting users from a first system of cordless power tools to a second system of cordless power tools which supports the existing level of a user's investment in rechargeable batteries, chargers and tool housings while maintaining the ability to replace, expand and upgrade any of the components. Ultimately, users are assured that the function and utility of their system is viable over time. Such a method has application for converting users of a company's existing tool system to a new tool system having a new battery/tool housing interface. This method also has application for converting users of a first company's tool system to a second company's tool system.

While the invention has been described in the specification and illustrated in the drawings with reference to one or more preferred embodiments, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiments illustrated by the drawings and described in the specification as the best mode presently contemplated for carrying out this invention, but that the invention will include any embodiments falling within the description of the appended claims.

What is claimed is:

1. An adapter for electrically and mechanically connecting a battery pack with a power tool, the battery pack and the power tool being otherwise incompatible, the adapter comprising:

a first portion for releasable attachment to the power tool;

a second portion for physically and securely receiving at least a portion of the battery pack;

a latching mechanism for securing the adapter to the power tool, the latching mechanism including a button connected to a housing of the adapter; and whereby the adapter completes an electrical circuit between the battery pack and the power tool;

wherein the adapter defines an aperture for receiving a nose portion of the battery pack.

2. The adapter for electrically connecting a battery pack with a power tool of claim 1, wherein the adapter includes a nose portion for receipt into an aperture of the power tool and defines an aperture for receiving a nose portion of the battery pack.

3. The adapter for electrically connecting a battery pack with a power tool of claim 2, wherein the aperture defined by the adapter extends in a direction generally parallel to the nose portion of the adapter.

4. A cordless power tool assembly comprising:

a tool housing;

an external working member extending from the tool housing for performing a working operation on a workpiece;

a motor in the housing for driving the working member;

a battery pack for providing power to the motor; and an adapter for electrically connecting the battery pack and the motor, the adapter releasably attached to the tool housing and physically receiving at least a portion of the battery pack;

wherein the adapter includes a nose portion receiving an aperture of the tool housing and defines an aperture receiving a nose portion of the battery pack.

5. The cordless power tool assembly of claim 4, wherein the adapter includes a pair of rails slidably engaging the tool housing and defines an aperture receiving a nose portion of the battery pack.

6. The cordless power tool assembly of claim 4, wherein the aperture defined by the adapter extends in a direction generally parallel to the nose portion of the adapter.

7. A method of adapting a power tool for use with a battery pack which is not directly attachable to the power tool, the method comprising the steps of:

providing an adapter for electrically connecting the battery pack to the power tool;

releasably attaching the adapter to the housing of the power tool;

physically receiving at least a portion of the battery pack by the adapter so as to establish an electrical circuit between the power tool and the battery pack;

driving an external working member of the power tool under the power of the battery pack to perform a working operation on a workpiece; and removing the battery pack from the adapter by depressing a latching mechanism carried by the battery pack;

wherein the step of physically receiving at least a portion of the battery pack by the adapter so as to establish an electrical circuit between the power tool and the battery pack includes the steps of providing the battery pack with a nose portion and inserting the nose portion into an aperture defined by the adapter.

8. A method of adapting a power tool for use with a battery pack which is not directly attachable to the power tool of claim 7, wherein the step of releasably attaching the adapter to the housing includes the steps of providing the adapter with a pair of rails and slidably engaging the rails with the housing.

9. A method of adapting a power tool for use with a battery pack which is not directly attachable to the power tool of claim 7, wherein the step of releasably attaching the adapter to the housing includes the steps of providing the adapter with a nose portion and inserting the nose portion into an aperture defined by the housing.

10. A method of adapting a power tool for use with a battery pack which is not directly attachable to the power tool of claim 7, wherein the step of physically receiving at least a portion of the battery pack by the adapter so as to establish an electrical circuit between the power tool and the battery pack includes the steps of providing the battery pack with a pair of rails and slidably engaging the rails with the adapter.

11. The adapter for electrically connecting a battery pack with a power tool of claim 1, wherein the aperture defined by the adapter extends in a direction generally perpendicular to the nose portion of the adapter.

12. The adapter for electrically connecting a battery pack with a power tool of claim 1, wherein the adapter includes a pair of rails for slidably engaging the power tool.

13. The adapter for electrically connecting a battery pack with a power tool of claim 12, wherein the button is connected to the housing of the adapter through a cantilevered portion.

14. The adapter for electrically connecting a battery pack with a power tool of claim 13, wherein the latching mechanism further comprises a spring for outwardly biasing the button.

15. The adapter for electrically connecting a battery pack with a power tool of claim 13, wherein the button includes a flange for engaging a groove defined by the housing of the power tool when the adapter is secured to the power tool.

16. The adapter for electrically connecting a batter pack with a power tool of claim 12, wherein the pair of rails extend in a direction parallel to an axis defined by the aperture of the adapter.

17. The adapter for electrically connecting a battery pack with a power tool of claim 1, in combination with the battery pack and power tool.

18. An adapter for electrically and mechanically connecting a battery pack with an electrical apparatus of a power tool system, the battery pack and the electrical apparatus being otherwise incompatible, the adapter comprising:

a first portion for releasable attachment to the electrical apparatus of the power tool system; and a second portion for physically receiving at least a portion of the battery pack;

whereby the adapter completes an electrical circuit between the battery pack and the electrical apparatus.

19. The adapter for electrically connecting a battery pack with an electrical apparatus of claim 18, further comprising a latching mechanism for securing the adapter to the electrical apparatus, the latching mechanism comprising a button connected to a housing of the adapter through a cantilevered portion.

20. The adapter for electrically connecting a battery pack with an electrical apparatus of claim 19, wherein the latching mechanism further comprises a spring for outwardly biasing the button.

21. The adapter for electrically connecting a battery pack with an electrical apparatus of claim 19, wherein the button includes a flange for engaging a groove defined by the housing of the electrical apparatus when the adapter is secured to the power tool.

22. The adapter for electrically connecting a battery pack with an electrical apparatus of claim 18, wherein the electrical apparatus is a power tool.

23. The adapter for electrically connecting a battery pack with an electrical apparatus of claim 18, wherein the electrical apparatus is a charger.

* * * * *

UNITED STATES PATENT AND TRADEMARK OFFICE
CERTIFICATE OF CORRECTION

PATENT NO. : 6,876,173 B2
DATED : April 5, 2005
INVENTOR(S) : Thomas Mastaler et al.

It is certified that error appears in the above-identified patent and that said Letters Patent is hereby corrected as shown below:

Title page,
Insert Item -- [60]     Related U.S. Application Data
       Provisional application No. 60/274,409, filed on Mar. 9, 2001. --.
Item [57], ABSTRACT,
Line 2, "An" should be -- an --.

Column 10,
Line 9, "batter" should be -- battery --.

Signed and Sealed this

Twenty-eighth Day of February, 2006

JON W. DUDAS
*Director of the United States Patent and Trademark Office*